US010819636B1

(12) United States Patent
Goel

(10) Patent No.: US 10,819,636 B1
(45) Date of Patent: Oct. 27, 2020

(54) METHODS, SYSTEMS, AND COMPUTER READABLE MEDIA FOR PRODUCER NETWORK FUNCTION (NF) SERVICE INSTANCE WIDE EGRESS RATE LIMITING AT SERVICE COMMUNICATION PROXY (SCP)

(71) Applicant: Oracle International Corporation, Redwood Shores, CA (US)

(72) Inventor: Yesh Goel, Bangalore (IN)

(73) Assignee: ORACLE INTERNATIONAL CORPORATION, Redwood Shores, CA (US)

(*) Notice: Subject to any disclaimer, the term of this patent is extended or adjusted under 35 U.S.C. 154(b) by 0 days.

(21) Appl. No.: 16/453,955

(22) Filed: Jun. 26, 2019

(51) Int. Cl.
*H04L 12/801* (2013.01)
*H04L 29/08* (2006.01)

(52) U.S. Cl.
CPC .............. *H04L 47/10* (2013.01); *H04L 67/28* (2013.01)

(58) Field of Classification Search
CPC ................................ H04L 47/10; H04L 67/28
USPC .................................................. 709/232, 230
See application file for complete search history.

(56) References Cited

U.S. PATENT DOCUMENTS

| | | | | |
|---|---|---|---|---|
| 5,381,413 A | * | 1/1995 | Tobagi | H04L 47/10 370/232 |
| 7,782,776 B2 | * | 8/2010 | Shankar | H04L 47/525 370/234 |
| 8,023,482 B2 | | 9/2011 | Gong et al. | |
| 8,300,637 B1 | | 10/2012 | Bennett, III et al. | |
| 8,879,431 B2 | | 11/2014 | Ridel et al. | |
| 8,954,080 B2 | | 2/2015 | Janakiraman et al. | |

(Continued)

FOREIGN PATENT DOCUMENTS

| | | |
|---|---|---|
| CN | 109788078 A | 5/2019 |
| EP | 2 575 303 A1 | 4/2013 |

(Continued)

OTHER PUBLICATIONS

Applicant-Initiated Interview Summary for U.S. Appl. No. 16/176,920 (dated Apr. 1, 2020).

(Continued)

*Primary Examiner* — Michael Won
(74) *Attorney, Agent, or Firm* — Jenkins, Wilson, Taylor & Hunt, P.A.

(57) ABSTRACT

Methods, systems, and computer readable media for network function (NF) service instance wide egress rate limiting include a process performed at a service communication proxy (SCP) and at a rate limiting policer. The process includes receiving service requests from consumer NFs and forwarding the service requests to SCP worker instances. The process further includes, at the SCP worker instances, requesting, from the rate limiting policer, which is separate from the SCP worker instances, producer NF service instance capacity for handling the service requests. The process includes, at the rate limiting policer, performing producer NF service instance wide egress rate limiting between the SCP worker instances and producer NF instances by granting or denying requests for producer NF service instance capacity from the SCP worker instances such that combined egress traffic from the SCP worker instances does not exceed rate capacities of the producer NF service instances.

18 Claims, 9 Drawing Sheets

(56) References Cited

U.S. PATENT DOCUMENTS

| | | | |
|---|---|---|---|
| 10,104,567 B2 | 10/2018 | Kodaypak | |
| 10,212,639 B2 | 2/2019 | Kodaypak | |
| 10,285,155 B1 | 5/2019 | Dodd-Noble et al. | |
| 10,299,128 B1 | 5/2019 | Suthar et al. | |
| 10,361,843 B1 | 7/2019 | Suthar et al. | |
| 10,375,530 B2 | 8/2019 | Buckley et al. | |
| 10,595,256 B1 | 3/2020 | Marupaduga et al. | |
| 10,609,154 B2 | 3/2020 | Talebi Fard et al. | |
| 10,609,530 B1 | 3/2020 | Patil et al. | |
| 10,616,934 B2 | 4/2020 | Talebi Fard et al. | |
| 2003/0174649 A1* | 9/2003 | Shankar | H04L 12/2898 |
| | | | 370/235 |
| 2003/0223414 A1* | 12/2003 | Wong | H04L 47/20 |
| | | | 370/389 |
| 2004/0003069 A1* | 1/2004 | Wong | H04L 47/32 |
| | | | 709/223 |
| 2004/0141473 A1 | 7/2004 | Buot | |
| 2005/0193096 A1 | 9/2005 | Yu et al. | |
| 2009/0222584 A1 | 9/2009 | Josefsberg et al. | |
| 2011/0078674 A1 | 3/2011 | Ershov | |
| 2013/0029708 A1 | 1/2013 | Fox et al. | |
| 2013/0039176 A1 | 2/2013 | Kanode et al. | |
| 2014/0379901 A1 | 12/2014 | Tseitlin et al. | |
| 2015/0016266 A1 | 1/2015 | Dumitrescu et al. | |
| 2015/0110000 A1 | 4/2015 | Zhang et al. | |
| 2015/0263987 A1 | 9/2015 | Klein et al. | |
| 2016/0142324 A1 | 5/2016 | Vihtari et al. | |
| 2016/0164788 A1 | 6/2016 | Goel et al. | |
| 2016/0315743 A1 | 10/2016 | Nagaraj et al. | |
| 2016/0352588 A1 | 12/2016 | Subbarayan et al. | |
| 2016/0373591 A1 | 12/2016 | Sharma et al. | |
| 2017/0195822 A1 | 7/2017 | Watfa et al. | |
| 2017/0221015 A1 | 8/2017 | June et al. | |
| 2017/0347283 A1 | 11/2017 | Kodaypak | |
| 2018/0035351 A1 | 2/2018 | Kodaypak | |
| 2018/0039494 A1 | 2/2018 | Lander et al. | |
| 2018/0159780 A1 | 6/2018 | Essigmann et al. | |
| 2018/0183724 A1* | 6/2018 | Callard | H04L 41/08 |
| 2018/0249281 A1 | 8/2018 | McCann | |
| 2018/0324247 A1 | 11/2018 | Hood et al. | |
| 2018/0324646 A1 | 11/2018 | Lee et al. | |
| 2018/0324671 A1 | 11/2018 | Palnati et al. | |
| 2018/0343567 A1 | 11/2018 | Ashrafi | |
| 2019/0007329 A1 | 1/2019 | Velev et al. | |
| 2019/0007366 A1 | 1/2019 | Voegele et al. | |
| 2019/0045351 A1 | 2/2019 | Zee et al. | |
| 2019/0075552 A1 | 3/2019 | Yu et al. | |
| 2019/0116486 A1 | 4/2019 | Kim et al. | |
| 2019/0116521 A1 | 4/2019 | Qiao et al. | |
| 2019/0140895 A1 | 5/2019 | Ennis, Jr. et al. | |
| 2019/0141527 A1 | 5/2019 | Krishan | |
| 2019/0158364 A1 | 5/2019 | Zhang et al. | |
| 2019/0173740 A1 | 6/2019 | Zhang et al. | |
| 2019/0174561 A1 | 6/2019 | Sivavakeesar | |
| 2019/0182875 A1 | 6/2019 | Talebi Fard et al. | |
| 2019/0191348 A1 | 6/2019 | Futaki et al. | |
| 2019/0191467 A1 | 6/2019 | Dao et al. | |
| 2019/0222633 A1 | 7/2019 | Howes et al. | |
| 2019/0223093 A1 | 7/2019 | Watfa et al. | |
| 2019/0230556 A1 | 7/2019 | Lee | |
| 2019/0261244 A1 | 8/2019 | Jung et al. | |
| 2019/0268270 A1* | 8/2019 | Fattah | H04L 43/12 |
| 2019/0306907 A1 | 10/2019 | Andreoli-Fang et al. | |
| 2019/0313236 A1 | 10/2019 | Lee et al. | |
| 2019/0313437 A1 | 10/2019 | Jung et al. | |
| 2019/0313469 A1 | 10/2019 | Karampatsis et al. | |
| 2019/0335002 A1 | 10/2019 | Bogineni et al. | |
| 2019/0335534 A1 | 10/2019 | Atarius et al. | |
| 2019/0342229 A1 | 11/2019 | Khinvasara et al. | |
| 2019/0342921 A1 | 11/2019 | Loehr et al. | |
| 2019/0349901 A1 | 11/2019 | Basu Mallick et al. | |
| 2019/0357092 A1 | 11/2019 | Jung et al. | |
| 2019/0380031 A1 | 12/2019 | Suthar et al. | |
| 2019/0394284 A1 | 12/2019 | Baghel et al. | |
| 2019/0394624 A1 | 12/2019 | Karampatsis et al. | |
| 2019/0394833 A1 | 12/2019 | Talebi Fard et al. | |
| 2020/0007632 A1 | 1/2020 | Landais et al. | |
| 2020/0008069 A1 | 1/2020 | Zhu et al. | |
| 2020/0028920 A1 | 1/2020 | Livanos et al. | |
| 2020/0045753 A1 | 2/2020 | Dao et al. | |
| 2020/0045767 A1 | 2/2020 | Velev et al. | |
| 2020/0053670 A1 | 2/2020 | Jung et al. | |
| 2020/0053724 A1 | 2/2020 | MolavianJazi et al. | |
| 2020/0053828 A1 | 2/2020 | Bharatia et al. | |
| 2020/0059420 A1 | 2/2020 | Abraham | |
| 2020/0059856 A1 | 2/2020 | Cui et al. | |
| 2020/0084663 A1 | 3/2020 | Park et al. | |
| 2020/0092423 A1 | 3/2020 | Qiao et al. | |
| 2020/0092424 A1 | 3/2020 | Qiao et al. | |
| 2020/0127916 A1 | 4/2020 | Krishan | |
| 2020/0136911 A1 | 4/2020 | Assali et al. | |

FOREIGN PATENT DOCUMENTS

| | | |
|---|---|---|
| WO | WO 2018/174021 A1 | 9/2018 |
| WO | WO 2018/174516 A1 | 9/2018 |
| WO | WO 2019/034609 A1 | 2/2019 |
| WO | WO 2019/062596 A1 | 4/2019 |
| WO | WO 2019/076273 A1 | 4/2019 |
| WO | WO 2019/144321 A1 | 8/2019 |
| WO | WO 2019/220172 A1 | 11/2019 |
| WO | WO 2020/091934 A1 | 5/2020 |

OTHER PUBLICATIONS

Non-Final Office Action for U.S. Appl. No. 16/176,920 (dated Mar. 6, 2020).

Notification of Transmittal of the International Search Report and the Written Opinion of the International Searching Authority, or the Declaration for International Application Serial No. PCT/US2019/053912 (dated Dec. 18, 2019).

Commonly-assigned, co-pending U.S. Appl. No. 16/697,021 for "Methods, Systems, and Computer Readable Media for Diameter-Peer-Wide Egress Rate Limiting at Diameter Relay Agent (DRA)," (Unpublished, filed Nov. 27, 2019).

"3rd Generation Partnership Project; Technical Specification Group Core Network and Terminals; 5G Systems; Network Function Repository Services; Stage 3 (Release 16)," 3GPP TS 29.510 V.16.1.1, pp. 1-87 (Oct. 2019).

"3rd Generation Partnership Project; Technical Specification Group Core Network and Terminals; 5G System; Technical Realization of Service Based Architecture; Stage 3 (Release 16)," 3GPP TS 29.500 V16.1.0, pp. 1-43 (Sep. 2019).

"3rd Generation Partnership Project; Technical Specification Group Service and System Aspects; System Architecture for the 5G System (5GS); Stage 2 (Release 16)," 3GPP TS 23.501 V16.2.0, pp. 1-391 (Sep. 2019).

"3rd Generation Partnership Project; Technical Specification Group Services and System Aspects; Architecture enhancements to facilitate communications with packet data networks and applications (Release 16)," 3GPP TS 23.682, V16.4.0, pp. 1-30 (Sep. 2019).

"Diameter and Diameter Applications," Alcatel-Lucent, http://infodoc.alcatel-lucent.com/html/0_add-h-f/93/0098-HTML/7750_SR_OS_Triple_Play_Guide/GX-PolicyMgmt.html, pp. 1-40 (Aug. 22, 2019).

"3rd Generation Partnership Project; Technical Specification Group Radio Access Network; NG-RAN; NG Application Protocol (NGAP) (Release 15)," 3GPP TS 38.413, V15.4.0, pp. 1-328 (Jul. 2019).

"3rd Generation Partnership Project; Technical Specification Group Core Network and Terminals; 5G System; Network Function Repository Services; Stage 3 (Release 16)," 3GPP TS 29.510, V16.0.0, pp. 1-135 (Jun. 2019).

"3rd Generation Partnership Project; Technical Specification Group Core Network and Terminals; 5G System; Restoration Procedures (Release 16)," 3GPP TS 23.527, V16.0.0, pp. 1-19 (Jun. 2019).

"3rd Generation Partnership Project; Technical Specification Group Core Network and Terminals; Numbering, addressing and identification (Release 15)," 3GPP TS 23.003, V15.7.0, pp. 1-131 (Jun. 2019).

(56) References Cited

OTHER PUBLICATIONS

Commonly-assigned, co-pending U.S. Appl. No. 16/356,446 for "Methods, Systems, and Computer Readable Media For Locality-Based Selection and Routing Of Traffic To Producer Network Fuctions (NFs)," (Unpublished, filed Mar. 18, 2019).
Penttinen, "5G Explained: Security and Deployment of Advanced Mobile Communications," Chapter 6, Section 6.3.8 NRF, 2 pages (Feb. 2019).
Commonly-assigned, co-pending U.S. Appl. No. 16/176,920 for "Methods, Systems, and Computer Redable Media for Providing a Service Proxy Function in a Telecommunications Network Core Using a Service-Based Architecture," (Unpublished, filed Oct. 31, 2018).
"CPS vDRA Configuration Guide," Release 18.3.0 (Restricted Release)(1), Cisco, pp. 1-130 (Sep. 14, 2018).
"How to Do Rate Limiting of Diameter Messages Using NetScaler," Citrix Systems Inc., pp. 1-3 (Sep. 4, 2018).
"3rd Generation Partnership Project; Technical Specification Group Services and System Aspects; Study on Enhancements to the Service-Based Architecture (Release 16)," 3GPP TR 23.742, V0.3.0, pp. 1-64 (Jul. 2018).
"3rd Generation Partnership Project; Technical Specification Group Services and System Aspects; Study on Enhancements to the Service-Based Architecture (Release 16)," 3GPP TR 23.742, V0.2.0, pp. 1-39 (Jun. 2018).
"5G; Procedures for the 5G System (3GPP TS 23.502 version 15.2.0 Release 15)," ETSI TS 123 502 V15.2.0, pp. 1-46 (Jun. 2018).
"Cisco Ultra 5G Packet Core Solution," Cisco, White paper, https://www.cisco.com/c/dam/en/us/products/collateral/routers/network-convergence-system-500-series-routers/white-paper-c11-740360.pdf, pp. 1-11 (2018).
Scholl et al., "An API First Approach to Microservies Development," Oracle, https://blog.oracle.com/developers/an-api-first-approach-to-microservies-development, pp. 1-12 (Nov. 8, 2017).
Brown et al., "Service-Based Architecture for 5G Core Networks," Huawei, Heavy Reading, https://www.3g4g.co.uk/5G/5Gtech_6004_2017_11_Service-Based-Architecture-for-5G-Core-Networks_HR_Huawei.pdf, pp. 1-12 (Nov. 2017).
"3rd Generation Partnership Project; Technical Specification Group Services and System Aspects; System Architecture for the 5G System; Stage 2 (Release 15)," 3GPP TS 23.501, V1.5.0, pp. 1-170 (Nov. 2017).
"Pseudo-CR on Service Discovery and Registration using NRF service," Ericsson, 3GPP TSG CT4 Meeting #79, 3GPP TR 29.891—v0.3.0, pp. 1-4 (Aug. 21-25, 2017).
Carlton et al., "HTTP and DNS in a 5G World," https://www.computerworld.com/article/3204594/http-and-dns-in-a-5g-world.html, pp. 1-5 (Jun. 30, 2017).
"Multi-Layer Security Protection for Signaling Networks," Oracle Communications, Oracle white paper, pp. 1-9 (Jan. 2016).
Kantola et al., "Policy-based communications for 5G mobile with customer edge switching," Security and Communication Networks, vol. 9, pp. 3070-3082 (2016).
Fielding et al. "Hypertext Transfer Protocol (HTTP/1.1): Semantics and Content", Internet Engineering Taskforce (IETF) Request for Comments: 7231, IETF RFC 7231, pp. 1-102 (Jun. 2014).
Fajardo et al., "Diameter Based Protocol," Internet Engineering Task Force (IETF) Request for Comments: 6733, pp. 1-152 (Oct. 2012).
Gulbrandsen et al, "A DNS RR for specifying the location of services (DNS SRV)," RFC 2782, pp. 1-12 (Feb. 2000).
Nichols et al., "Definition of the Differentiated Services Field (DS Field) in the IPv4 and IPv6 Headers," Internet Engineering Task Force (IETF) Netwok Working Group Request for Comments (RFC) 2474, The Internet Society, pp. 1-20 (Dec. 1998).
"Class of Service Feature Guide (Routers and EX9200 Switches)", Junos OS, Juniper Networks, pp. 1-1530 (Apr. 10, 2019).
"3rd Generation Partnership Project; Technical Specification Group Servies and System Aspects; System Architecture and 5G; Stage 2 (Release 16)", 3GPP TS 23.501, V16.0.0, pp. 1-318 (Mar. 2019).

"Oracle Communication Diameter Signaling Router", Release Notice, Release 8.3, E93179 Revision 02, Oracle, pp. 1-98 (Dec. 2018).
"Addressing 5G Network Functio Requirements", Intel FPGAs and Intel PAC 5G Qos and IPSec Benchmarking, White Paper, pp. 1-8 (Oct. 2018).
5G; 5G System; Technical Realization of Service Based Architecture; Stage 3 (3GPP TS 29.500 version 15.0.0 Release 15) ETSI TS 129 500 V15.0.0, pp. 1-29 (Jul. 2018).
Benacer et al., "A High-Speed Traffic Manager Architecture for Flow-Based Networking", pp. 1-4 (2017).
"Dynamically Reconfigurable Optical-Wireless Backhaul/Fronthaul with Cognitive Control Plane for Small Cells and Cloud-RANs: D3.1 Analysis of state of the art on scalable control plane design and techniques for user mobility awareness. Definition of 5G-XHaul control plane requirements", European Commision, 5G-XHaul, pp. 1-107 (Jun. 31, 2016).
Notice of Allowance and Fee(s) Due for U.S. Appl. No. 16/280,672 (dated Sep. 25, 2019).
Commonly-assigned, co-pending U.S. Appl. No. 16/415,758 for "Methods, Systems, and Computer Readable Media for Providing Reduced Signaling Internet of Things (IoT) Device Monitoring," (Unpublished, filed May 17, 2019).
Commonly-assigned, co-pending U.S. Appl. No. 16/399,428 for "Methods, Systems, and Computer Readable Media for Monitoring Lightweight Machine to Machine (LWM2m) Internet of Things (IoT) Devices Through Service Capability Exposure Function (SCEF) T8 Interface," (Unpublished, filed Apr. 30, 2019).
"3rd Generation Partnership Project; Technical Specification Group Core Network and Terminals; Home Subscriber Server (HSS) diameter interfaces for interworking with packet data networks and applications (Release 15)," 3GPP TS 29.336, V15.6.0, pp. 1-79 (Mar. 2019).
"3rd Generation Partnership Project; Technical Specification Core Network and Terminals; Evolved Packet System (EPS); Mobility Management Entity (MME) and Serving GPRS Support Node (SGSN) related interfaces based on Diameter protocol (Release 15)," 3GPP TS 29.272, V15.7.0, pp. 1-179 (Mar. 2019).
"3rd Generation Partnership Project; Technical Specification Group Service and Systems Aspects; Architecture enhancements to facilitate communications with packet data networks and applications (Release 16)," 3GPP TS 23.682, V16.2.0, pp. 1-126 (Mar. 2019).
"3rd Generation Partnership Project; Technical Specification Group Core Network and Terminals; T8 reference point for Northbound APIs; (Release 16)," 3GPP TS 29.122, V16.1.0, pp. 1-288 (Mar. 2019).
Commonly-assigned, co-pending U.S. Appl. No. 16/369,691 for "Methods, System, and Computer Readable Media for Handling Multiple Versions of Same Service Provided by Producer Network Functions (NFs)," (Unpublished, filed Mar. 29, 2019).
Commonly-assigned, co-pending U.S. Appl. No. 16/287,808 for "Methods, Systems, and Computer Readable Media for Dynamically Provisioning and Using Public Land Mobile Network (PLMN) Location Mapping in Service Capability Exposure Function (SCEF) or Network Exposure Function (NEF)," (Unpublished, filed Feb. 27, 2019).
Commonly-assigned, co-pending U.S. Appl. No. 16/280,672 for "Methods, Systems, and Computer Readable Media for (IoT) Device State Through Service Capability Exposure Function (SCEF)," (Unpublished, filed Feb. 20, 2019).
"OMA Lightweight Machine to Machine Requirements," Candidate Version 1.2, Open Mobile Alliance, pp. 1-20 (Jan. 24, 2019).
"3rd Generation Partnership Project; Technical Specification Group Services and System Aspects; Architecture enhancements to facilitate communications with packet data networks and applications (Release 15)," 3GPP TS 23.682, V16.1.0, pp. 1-126 (Dec. 2018).
"3rd Generation Partnership Project; Technical Specification Group Radio Access Network; Evolved Universal Terrestrial Radio Access Network (E-UTRAN); S1 Application Protocol (S1AP) (Release 15)," 3GPP TS 36.1413, V15.4.0, pp. 1-383 (Dec. 2018).
"3rd Generation Partnership Project; Technical Specification Group Network and Terminals; 5G Systems: Netowrk Function Repository Services; Stage 3 (Release 15)," 3GPP TS 29.510, V15.2.0, pp. 1-113 (Dec. 2018).

(56) References Cited

OTHER PUBLICATIONS

"3rd Generation Partnership Project; Technical Specification Group Network and Terminals; 5G Systems; Principles and Guidelines for Services Definition; Stage 3 (Release 15)," 3GPP TS 29.501, V15.2.0, pp. 1-66 (Dec. 2018).

"3rd Generation Partnership Project; Technical Specification Group Core Network and Terminals; Home Subscriber Server (HSS) diameter interfaces for interworking with packet data networks and applications (Release 15)," 3GPP TS 29.336, V15.5.0, pp. 1-74 (Dec. 2018).

"3rd Generation Partnership Project; Technical Specification Group Core Network and Terminals; Mobility Management Entity (MME) and Serving GPRS Support Node (SGSG) interfaces for interworking with packet data networks and applications (Release 15)," 3GPP TS 29.128, V15.4.0, pp. 1-52 (Dec. 2018).

"3rd Generation Partnership Project; Technical Specification Group Core Network and Terminals; T8 reference point for Northboud APIs; (Release 15)," 3GPP TS 29.122, V15.2.0, pp. 1-297 (Dec. 2018).

"3rd Generation Partnership Project; Technical Specification Group Core Network and Terminals; Mobile Application Part (MAP) specification (Release 15)," 3GPP TS 29.002, V15.4.0, pp. 1-1021 (Dec. 2018).

"3rd Generation Partnership Project; Technical Specification Group Services and System Aspects; Study on Enhancements to the Service-Based Architecture (Release 16)," 3GPP TR 23.742, V16.0.0, pp. 1-131 (Dec. 2018).

"Diameter Signaling Router SCEF User's Guide," Release 8.3, E93572, Oracle® Communications, pp. 1-110 (Sep. 2018).

"3rd Generation Partnership Project; Technical Specification Group Services and System Aspects; Universal Geographical Area Description (GAD) (Release 15)," 3GPP TS 23.032, pp. 1-32 (Sep. 2018).

"3rd Generation Partnership Project; Technical Specification Group Core Network and Terminals; Customised Applications for Mobile network Enhanced Logic (CAMEL) Phase 4; Stage 2 (Release 15)," 3GPP TS 23.078, V15.0.0, pp. 1-750 (Jun. 2018).

"Lightweight Machine to Machine Techinical Specification: Transport Bindings," Candidate Version: 1.1, Open Mobile Alliance, pp. 1-67 (Jun. 12, 2018).

"Lightweight Machine to Machine Technical Specification: Core," Candidate Version: 1.1, Open Mobile Alliance, pp. 1-142 (Jun. 12, 2018).

Mayer, Georg (Huawei), "3GPP 5G CoreNetwork Status," 3GPP A Global Initiative, pp. 1-23 (Nov. 2017).

"3rd Generation Partnership Project; Technical Specification Group Services and System Aspects; Architecture enehanements to facilitate communications with packet data networks and applications (Release 15)," 3GPP TS 23.682, V15.2.0, pp. 1-122 (Sep. 2017).

Boremann et al. "Block-Wise Transfers in the Constrained Application Protocol (CoAP)," RFC 7959, pp. 1-37 (Aug. 2016).

Hartke, "Observie Resources in the Constrained Application Protocol (CoAP)," RFC 7641, pp. 1-30 (Sep. 2015).

Shelby et al., "The Constrained Application Protocol (CoAP)," RFC 7252, pp. 1-112 (Jun. 2014).

Preston-Werner, "Semantic Versioning 2.0.0", Oracle, pp. 1-5 (Jun. 2013).

Notification of Transmittal of the International Search Report and the Written Opinion of the International Searching Authority, or the Declaration for International Application Serial No. PCT/US2020/035004 (dated Jul. 7, 2020).

Notice of Allowance and Fee(s) Due for U.S. Appl. No. 16/369,691 (dated May 12, 2020).

Non-Final Office Action for U.S. Appl. No. 16/356,446 (dated May 11, 2020).

Notice of Allowance and Fee(s) Due for U.S. Appl. No. 16/176,920 (dated Apr. 16, 2020).

Chesire et al., "Apple's DNS Long-Lived Queries protocol," Network Working Group, Apple, Inc., pp. 1-26 (Aug. 22, 2019).

Abley et al., "A Mechanism for Remote-Triggered DNS Cache Flushes (DNS FLUSH)," Network Working Group, Google, pp. 1-12 (Jun. 24, 2013).

Non-Final Office Action for U.S. Appl. No. 16/555,817 (dated Aug. 7, 2020).

Notification of the Transmittal of the International Search Report and the Written Opinion of the International Searching Authority, or the Declaration for International Application No. PCT/US2020/034723 (dated Aug. 17, 2020).

* cited by examiner

METHODS, SYSTEMS, AND COMPUTER READABLE MEDIA FOR PRODUCER NETWORK FUNCTION (NF) SERVICE INSTANCE WIDE EGRESS RATE LIMITING AT SERVICE COMMUNICATION PROXY (SCP)

TECHNICAL FIELD

The subject matter described herein relates to performing rate limiting of network service requests to producer NFs. More particularly, the subject matter described herein relates to methods, systems, and computer readable media for producer NF service instance wide egress rate limiting at an SCP.

BACKGROUND

In the 5G network architecture specified by the 3rd Generation Partnership Project (3GPP), the network function (NF) is a network node that provides or consumes services. NFs that provide services are called producer NFs. NFs that consume services are called consumer NFs. An NF can be a producer or a consumer depending on the context. The NF repository function (NRF) is the network entity that maintains the NF profiles of available NF instances and their supporting services. The NRF also allows other NF instances to subscribe to and be notified regarding the registration in the NRF of new/updated producer NF service instances of a given type. The NRF supports service discovery functions by receiving NF discovery requests and providing information about available NFs.

The service communication proxy (SCP) is a node that can be used for indirect communications between consumer NFs and producer NFs. In indirect communications, consumer NFs send service requests to the SCP, the SCP selects a producer NF to handle each service request, and the SCP forwards the service requests to the producer NFs. The SCP also forwards responses from the producer NFs to the consumer NFs. According to 3GPP TS23.501, $3^{rd}$ Generation Partnership Project; Technical Specification Group Services and System Aspects; System Architecture for the 5G System; Stage 2 (Release 16), V16.0.0 (2019-03), the disclosure of which is incorporated herein by reference in its entirety, load balancing, monitoring, and overload control provided by the SCP is left up to the implementation but does not specify implementation details.

One problem with existing processes used to select producer NFs is that producer NF selection decisions may be made by individual entities that are not aware of producer NF capacity based on service requests routed to the producer NFs from other entities. For example, producer NFs may receive service requests from different consumer NFs or entities functioning as proxies for the consumer NFs. The consumer NFs or the entities acting as proxies for the consumer NFs may be aware not be aware of the capacity of a producer NF or of the amount of that capacity used by other consumer NFs or proxies. As a result, a producer NF can become overwhelmed with service request from one entity that is not aware of service requests sent to the producer NF service instance from another entity.

Accordingly, in light of these difficulties, there exists a need to methods, systems, and computer readable media for producer NF service instance wide egress rate limiting.

SUMMARY

The subject matter described herein includes methods, systems, and computer readable media for producer network function (NF) service instance wide egress rate limiting. One method includes steps performed at a service communication proxy (SCP) including at least one processor. The steps include receiving service requests from consumer NFs. The steps further include forwarding the service requests to SCP worker instances. The steps further include, at the SCP worker instances, requesting, from a rate limiting policer separate from the SCP worker instances, producer NF service instance capacity for handling the service requests. The method also includes steps performed at the rate limiting policer. The steps include performing producer NF service instance wide egress rate limiting between the SCP worker instances and producer NF service instances by granting or denying requests for producer NF service instance capacity from the SCP worker instances such that combined egress traffic from the SCP worker instances does not exceed rate capacities of the producer NF service instances.

According to one aspect of the subject matter described herein, requesting producer NF service instance capacity from the rate limiting policer includes requesting an allocation of tokens from the rate limiting policer, where the tokens are usable by the SCP worker instances to determine whether to grant or deny the service requests.

According to one aspect of the subject matter described herein, performing NF service instance wide rate limiting includes accessing a database for determining amounts of available tokens for each of the producer NF service instances.

According to another aspect of the subject matter described herein, requesting an allocation of tokens includes requesting the allocation of tokens in response to a percentage of granted tokens available to one of the SCP worker instances being less than a threshold amount.

According to yet another aspect of the subject matter described herein, the rate limiting policer maintains, for each of the NF service instances, a maximum limit of tokens that can be allocated a time interval and grants or denies the requests for allocation of tokens based on whether a number of tokens requested by the requests for allocation of tokens would cause the maximum limit of tokens to be exceeded.

According to yet another aspect of the subject matter described herein, performing NF service instance wide egress rate limiting includes implementing a fixed window during which tokens can be granted.

According to yet another aspect of the subject matter described herein, performing the NF service instance wide egress rate limiting includes implementing a sliding window during which tokens can be granted.

According to yet another aspect of the subject matter described herein, performing producer NF service instance wide rate limiting policing includes implementing best effort allocation wherein if a number of tokens requested by one of the SCP worker instances during a time interval would cause the maximum allocated tokens during a time interval to be exceeded, granting a remainder tokens available in the time interval that would not cause the maximum limit of tokens to be exceeded.

According to yet another aspect of the subject matter described herein, performing producer NF service instance wide egress rate limiting includes implementing max limit token allocation by denying a request for allocation of tokens if a requested number of tokens would cause the maximum limit of tokens to be exceeded.

According to yet another aspect of the subject matter described herein, the SCP comprises a service communication proxy (SCP).

According to yet another aspect of the subject matter described herein, a system for network function (NF) service instance wide egress rate limiting is provided. The system includes a service communication proxy (SCP) including at least one processor for receiving service requests from consumer NFs, forwarding the service requests to SCP worker instances implemented by the SCP, and requesting, by the SCP worker instances, producer NF service instance capacity for handling the service requests. The system further includes a rate limiting policer for performing producer NF service instance wide egress rate limiting between the SCP worker instances and producer NF instances by granting or denying requests for producer NF service instance capacity from the SCP worker instances such that combined egress traffic from the SCP worker instances does not exceed rate capacities of the producer NF service instances.

According to yet another aspect of the subject matter described herein, the SCP worker instances are configured to request producer NF service instance capacity from the rate limiting policer by requesting an allocation of tokens from the rate limiting policer, where the tokens are usable by the SCP worker instances to determine whether to grant or deny the service requests.

According to yet another aspect of the subject matter described herein, the system includes a database accessible by the rate limiting policer for determining amounts of available tokens for each of the producer NF service instances.

According to yet another aspect of the subject matter described herein, the SCP worker instances are configured to request an allocation of tokens in response to a number of granted tokens available to one of the SCP worker instances being less than a threshold value.

According to yet another aspect of the subject matter described herein, the rate limiting policer is configured to maintain, for each of the NF service instances, a maximum limit of tokens that can be allocated a time interval and to grant or deny the requests for allocation of tokens based on whether a number of tokens requested by the requests for allocation of tokens would cause the maximum limit of tokens to be exceeded.

According to yet another aspect of the subject matter described herein, the rate limiting policer is configured to perform NF service instance wide egress rate limiting by implementing a fixed window during which tokens can be granted.

According to yet another aspect of the subject matter described herein, the rate limiting policer is configured to perform the NF service instance wide egress rate limiting by implementing a sliding window during which tokens can be granted.

According to yet another aspect of the subject matter described herein, the rate limiting policer is configured to performing the producer NF service instance wide rate limiting policing by implementing best effort allocation wherein if a number of tokens requested by one of the SCP worker instances during a time interval would cause the maximum allocated tokens during a time interval to be exceeded, granting a remainder tokens available in the time interval that would not cause the maximum limit of tokens to be exceeded.

According to yet another aspect of the subject matter described herein, the rate limiting policer is configured to performing producer NF service instance wide egress rate limiting by implementing max limit token allocation, which includes denying a request for allocation of tokens if a requested number of tokens would cause the maximum limit of tokens to be exceeded.

According to yet another aspect of the subject matter described herein, a non-transitory computer readable medium having stored thereon executable instructions that when executed by the processor of a computer control the computer to perform steps is provided. The steps include a first set performed at a service communication (SCP) including at least one processor. The first set of steps include receiving service requests from consumer NFs, forwarding the service requests to SCP worker instances, and at the SCP worker instances, requesting, from a rate limiting policer separate from the SCP worker instances, producer NF service instance capacity for handling the service requests. The steps further include a second set performed at the rate limiting policer. The second set of steps include performing producer NF service instance wide egress rate limiting between the SCP worker instances and producer NF instances by granting or denying requests for producer NF service instance capacity from the SCP worker instances such that combined egress traffic from the SCP worker instances does not exceed rate capacities of the producer NF service instances.

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

DETAILED DESCRIPTION

Figure 1:
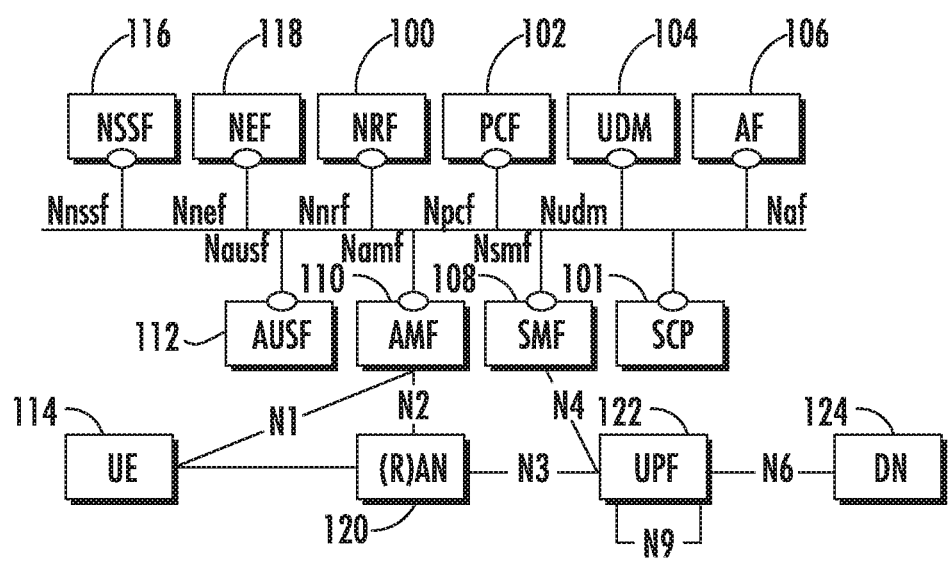
FIG. 1 is a network diagram illustrating an exemplary 5G network architecture including producer NFs, consumer NFs, an NRF, and an SCP.

The subject matter described herein relates to methods, systems, and computer readable media for producer NF service instance wide egress rate limiting at a service communication proxy. As stated above, one problem with existing network architectures is that 5G producer NF service instances can become overwhelmed with traffic from multiple different consumers. In order to more fully explain rate limiting policing, a background on the 5G service producer and service consumer network architecture will first be presented. FIG. 1 is a block diagram illustrating an exemplary 5G system network architecture. The architecture in FIG. 1 includes NRF 100 and SCP 101 located in the home public land mobile network (HPLMN). As described above, NRF 100 may maintain profiles of available producer NF service instances and their supported services and allows consumer NFs to subscribe to and be notified of the registration of new/updated producer NF service instances. SCP 101 may also support service discovery and selection of producer NFs. In addition, SCP 101 may perform load balancing of connections between consumer and producer NFs.

In FIG. 1, any of the nodes besides NRF 100 and SCP 101 can be either consumer NFs or producer NFs, depending on whether they are requesting or providing services. In the illustrated example, the nodes include a policy control function (PCF) 102 that performs policy related operations in a network, a user data management (UDM) function 104 that manages user data, and an application function 106 that provides application services. The nodes illustrated in FIG. 1 further include a session management function (SMF) 108 that manages sessions between access and mobility management function (AMF) 110 and PCF 102. AMF 110 performs mobility management operations, similar to those performed by a mobility management entity (MME) in 4G networks. An authentication server function (AUSF) 112 performs authentication services for user equipment (UEs), such as UE 114, seeking access to the network.

A network slice selection function (NSSF) 116 provides network slicing services for devices seeking to access specific network capabilities and characteristics associated with a network slice. A network exposure function (NEF) 118 provides application programming interfaces (APIs) for application functions seeking to obtain information about Internet of things (IoT) devices and other UEs attached to the network.

A radio access network (RAN) 120 connects UE 114 to the network via a wireless link. Radio access network 120 may be accessed using a g-Node B (gNB) or other wireless access point. A user plane function (UPF) 122 can support various proxy functionality for user plane services. One example of such proxy functionality is multipath transmission control protocol (MPTCP) proxy functionality. UPF 122 may also support performance measurement functionality which may be used by UE 114 to obtain network performance measurements. Also illustrated in FIG. 1 is a data network (DN) 124 through which UEs access data network services, such as Internet services.

As stated above, producer NFs register with the NRF to indicate the type of services that the producer NFs provide. Producer NFs can also register capacity and priority information with the NRF. Consumer NFs can discover producer NFs that have registered to provide a specific service and can use the capacity and priority information to select a producer NF.

Consumer NFs can communicate directly with NF service producer NFs. Alternatively, consumer NFs can communicate indirectly with producer NFs via the SCP. In direct communication, the consumer NF performs discovery of the target producer NF either by local configuration or via the NRF. The consumer NF then communicates directly with the target service producer NF. In indirect mode, the consumer NF sends service request messages to the SCP, and the SCP may perform service discovery and selection of a producer NF on behalf of a consumer NF.

Figure 2:
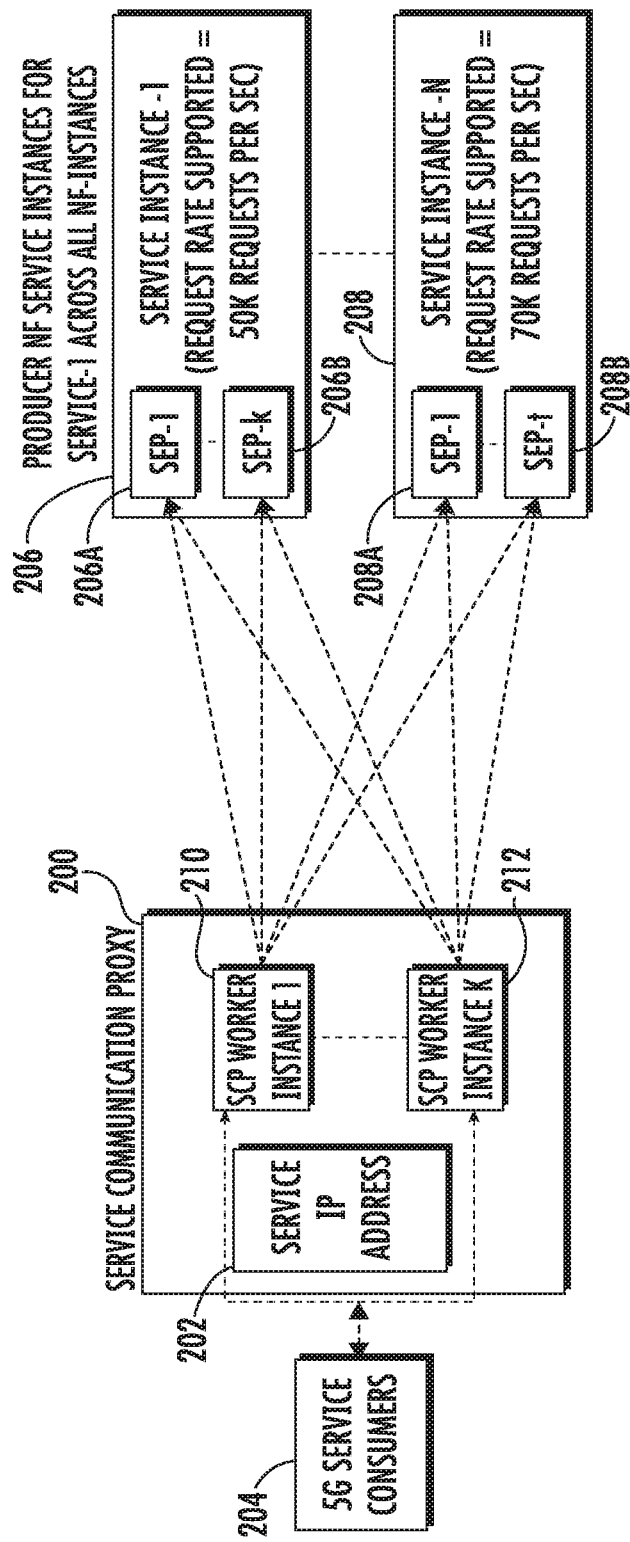
FIG. 2 is a network diagram illustrating the forwarding of service requests from SCP worker instances to producer NF service instances without egress rate limiting of requests from the SCP worker instances to the producer NF server instances.

The subject matter described herein includes a service communication proxy (SCP) that resides between 5G consumer NFs and producer NFs. The SCP may perform SCP functions, as defined in 3GPP TS 23.501. Such functions may include producer NF service discovery, producer NF selection, routing of messages between consumer NFs and producer NFs, and load balancing between producer NFs and consumer NFs. FIG. 2 is a network diagram illustrating an exemplary architecture where the service communication proxy resides between the producer and consumer NFs. In FIG. 2, service communication proxy 200 provides a service IP address 202 to which 5G consumer NFs 204 connect to receive service from producer NFs 206 and 208. service communication proxy 200 forwards requests from consumer NFs 204 to producer NFs 206 and 208 and routes responses from producer NFs 206 and 208 to consumer NFs 204. service communication proxy 200 includes SCP worker instances 210 and 212 that are deployed in a scalable manner such that ingress service requests from consumer NFs 204 are load balanced among SCP worker instances 210 and 212. Each SCP worker instance 210 and 212 is connected to all of the producer NF service instances 206 and 208 for redundancy and load distribution purposes. In the illustrated example, SCP worker instance 210 initiates HTTP2 service connections with producer NF service instance 206 and producer NF service instance 208 via service endpoints 206A, 206B, 208A, and 208B, respectively. Similarly, SCP worker instance 212 establishes HTTP2 service connections with producer NF service instances 206 and 208 via service endpoints 206A, 206B, 208A, and 208B, respectively. Each of service endpoints 206A, 206B, 208A, and 208B may be service access points advertised by producer NF service instances 206 and 208.

Service communication proxy 200 may be implemented using a computing platform including at least one processor and a memory. The computing platform may be configured for on-premises deployment in a facility managed by a network service provider or for cloud network deployment. In a cloud deployment, service communication proxy may be offered as a cloud service to network service providers.

Figure 3:
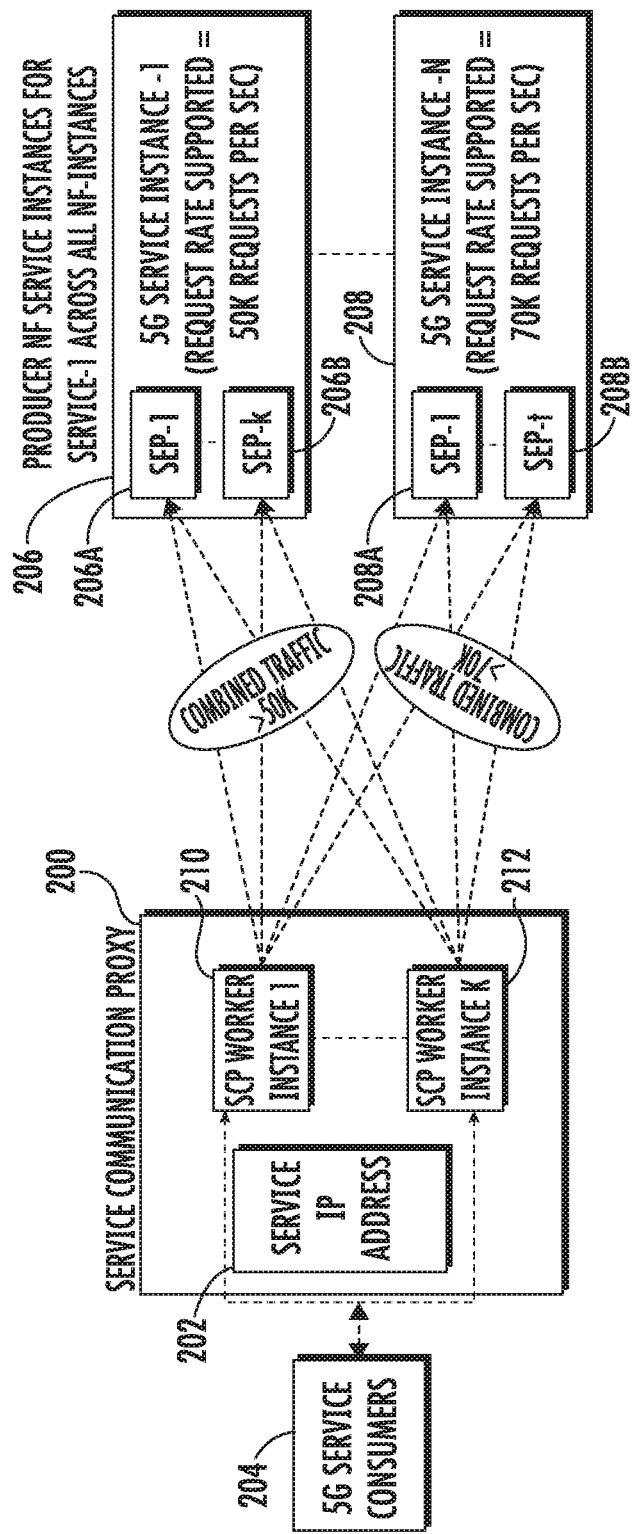
FIG. 3 is a network diagram illustrating the forwarding of requests from the SCP to producer NF service instances where the capacities of the producer NF service instances are exceeded by requests from different SCP worker instances.

FIG. 3 is a network diagram illustrating problems that can occur with the architecture illustrated in FIG. 2 without egress rate policing for service requests generated by SCP 200 to the producer NF service instances. Producer NF service instances 206 and 208 may publish their rate capacities to SCP 200. In FIG. 3, producer NF service instance 206 has a published rate capacity of 50,000 requests per second. Producer NF service instance 208 has a published rate capacity of 70,000 requests per second. The rate capacities define a number of new service requests that each producer NF can handle in a time period. Even though SCP 200 is aware of the rate capacity of each producer NF, because SCP 200 uses multiple SCP worker instances to send service requests to producer NFs 206 and 208, and the SCP worker instances are not aware of service requests sent by other SCP worker instances, the rate capacity of producer NF service instances 206 and 208 can be exceeded for a given time interval.

In order to avoid this problem, rate limiting should be applied on a per producer NF service instance basis so that producer NF service instances are protected against receiving traffic from independent entities that exceeds the capacities of the producer NFs. Challenges with the architecture illustrated in FIG. 3 include the fact that multiple SCP worker instances can connect and route messages to the same producer NF, and the SCP worker instances are unaware of the transmission rates of other SCP worker instances. As a result, there is a high possibility of overloading the producer NF service instances.

One possible solution to this problem is to provide a static allocation of capacities by each producer NF to the each of SCP worker instances. For example, producer NF service instance 206 could statically allocate half of its total capacity to SCP worker instance 210 and the other half to SCP worker instance 212. One problem with this approach is that the capacity of producer NF service instance 206 could be underutilized when incoming service requests are not evenly distributed among SCP worker instances 210 and 212. Another problem with requiring SCP worker instances to police their own egress traffic rates is that there can be multiple endpoints for egress service instances and tracking rate limits per NF service instance may unnecessarily complicate the SCP worker instance logic. Another problem with statically allocating producer NF capacity among SCP worker instances is that new SCP worker instances may be continually established, requiring re-allocation of static capacities among the new and pre-existing SCP worker instances.

Figure 4:
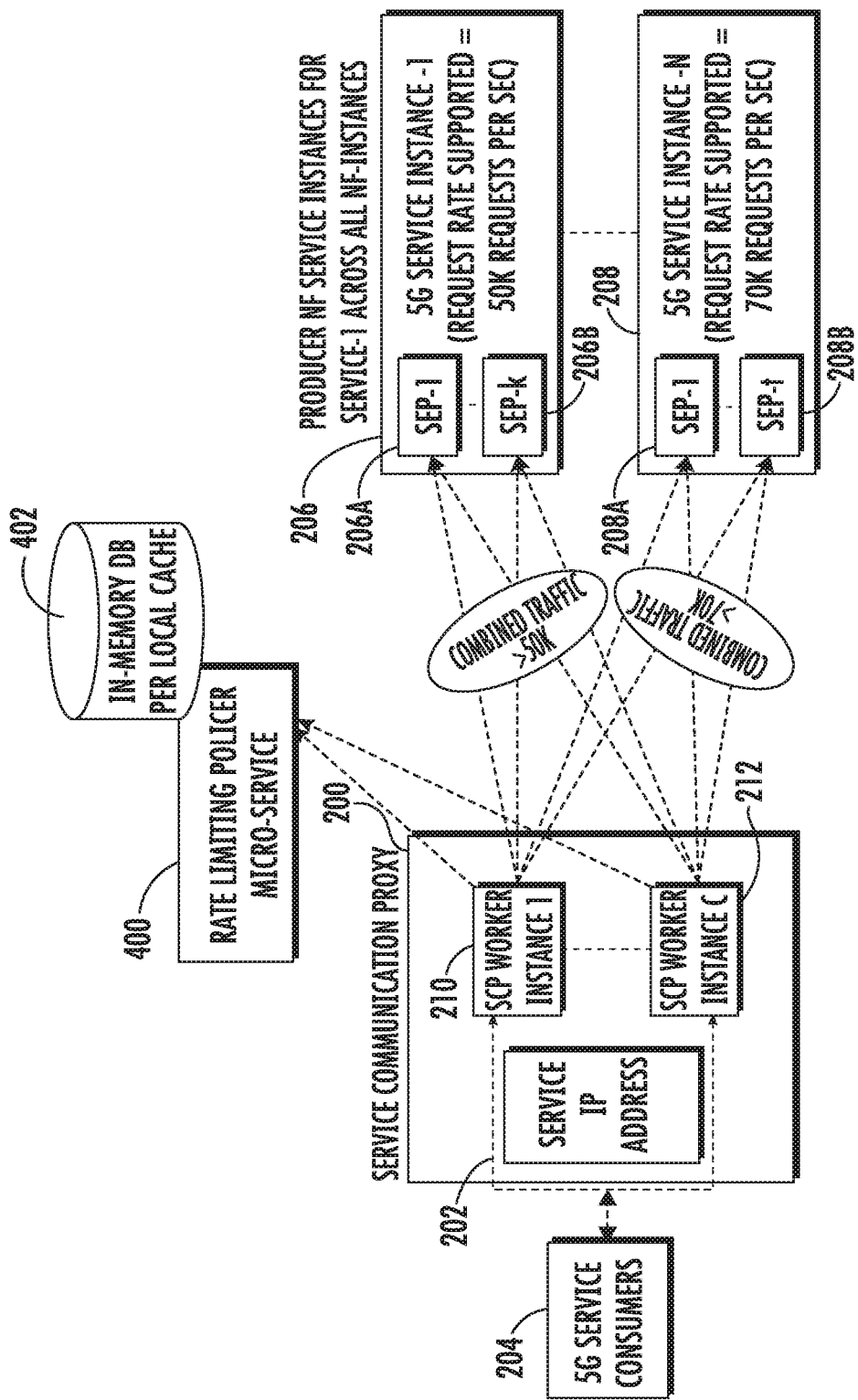
FIG. 4 is a network diagram illustrating egress rate limiting of traffic between SCP worker instances and producer NF service instances.

FIG. 4 is a network diagram illustrating the architecture in FIG. 3 with a rate limiting policer 400 implemented as a microservice separate from the SCP worker instances to perform egress rate limiting on a per NF service instance basis. In the illustrated example, rate limiting policer 400 includes an in-memory database or cache 402 that maintains total rate limit capacity per producer NF service instance and controls allocations of the capacities among SCP worker instances 210 and 212. Rate limiting policer 400 may receive producer NF capacity information from the producer NFs or from SCP 200, which receives the capacity information from the producer NFs.

SCP worker instances 212 are entities that are instantiated by SCP 200 to handle service requests from consumer NFs. In general, the functions of an SCP worker instance include receiving incoming service requests from consumer NFs, selecting producer NFs to handle the service requests (e.g., based on the type of service to be provided), requesting producer NF service instance capacity from rate limiting policer 400, and forwarding or dropping the service requests depending on whether the producer NF service instance capacity granted by the rate limiting policer is sufficient to handle the requests. Rate limiting policer 400 receives requests from SCP worker instances 210 and 212 for allocation of capacity of a given service. Rate limiting policer 400 allocates rate capacity slices to each SCP worker per NF service instance using a token bucket algorithm, which will be described below. The available or used capacities of each producer NF service instance 206 and 208 may be maintained in database 402 for fast access.

Rate limiting policer 400 may be implemented using a computing platform including at least one processor and a memory. The computing platform may be configured for on-premises deployment in a facility managed by a network service provider or for cloud network deployment. In a cloud deployment, rate limiting policer 400 may be offered as a cloud service to network service providers.

Using the architecture illustrated in FIG. 4, rate limiting logic at each SCP worker instance 210 and 212 is simplified because the SCP worker instances are not required to maintain used capacities of producer NF service instances. Instead, each SCP worker instance 210 and 212 determines whether it has sufficient producer NF service instance capacity granted by rate limiting policer 400 to process service requests from consumer NFs 204. If an SCP worker instance does not have sufficient producer NF service instance capacity, the worker requests additional capacity from rate limiting policer 400. If rate limiting policer 400 grants the capacity to an SCP worker instance, the SCP worker instance can accept the corresponding service requests and route the requests to the NF service instance 206 or 208 according to the granted capacity. If the SCP worker instance is unable to obtain sufficient capacity to handle a new request, the SCP worker instance may drop traffic for the producer NF service instance. In this manner, rate limiting is seamless to SCP worker instances, scaling up or scaling down.

Figure 5:
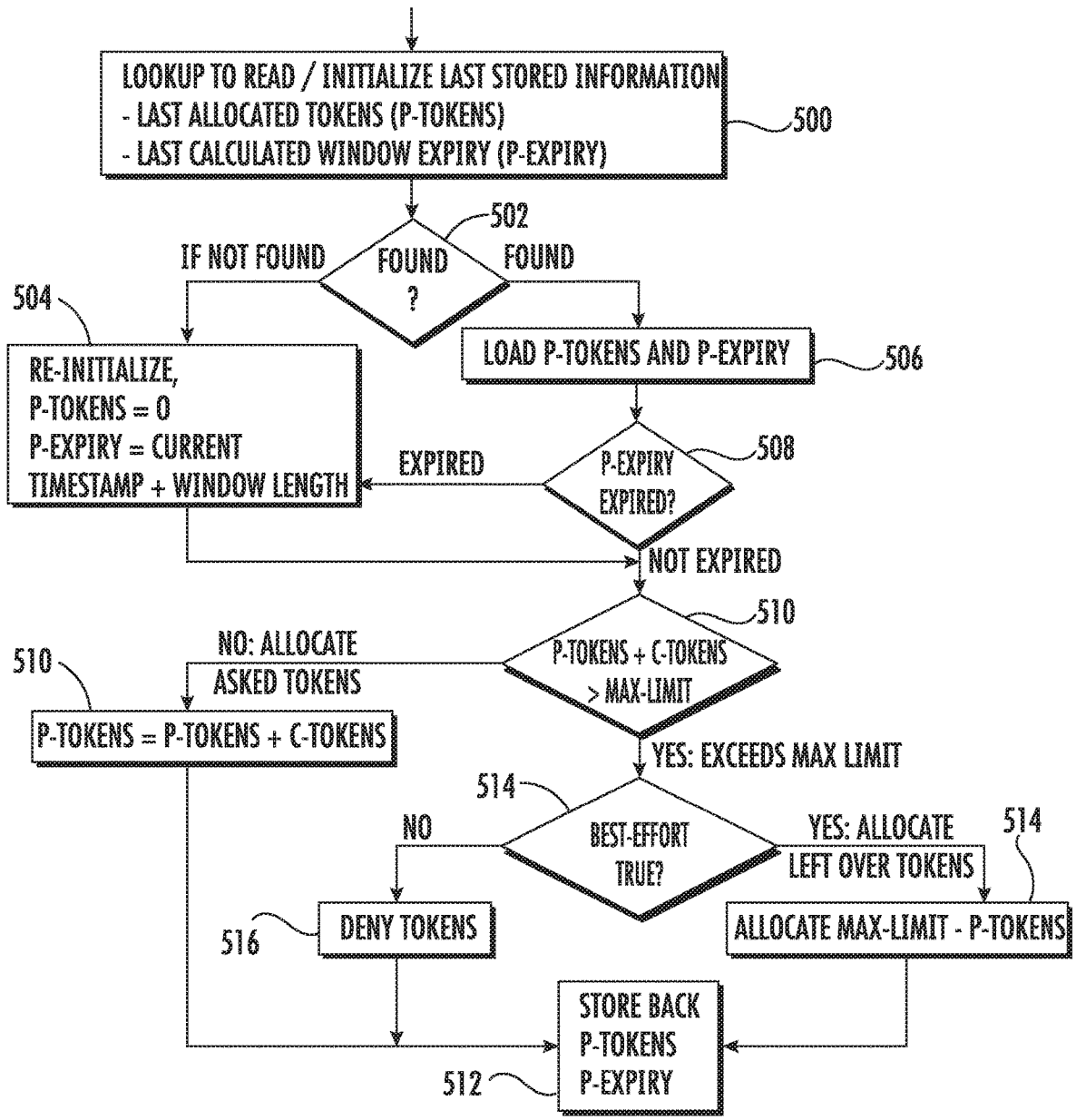
FIG. 5 is a flow chart illustrating an exemplary fixed window token bucket algorithm that may be implemented by the rate limiting policer in FIG. 4 to prevent producer NF service instances from being overwhelmed with traffic from consumer NF service instances.

As stated above, in one example, rate limiting policer 400 implements a token bucket algorithm for performing rate limiting policing on a per service instance basis. The token bucket algorithm may be implemented for every producer NF service instance 206 or 208 for every rate limiting window, where rate limiting window is a time period, such as 1 second, over which a rate limiting capacity of an NF service instance can be defined using a number of tokens that can be granted during the window. An SCP worker instance may demand multiple tokens in a rate limiting window from rate limiting policer 400 (1 token for each pending request from a consumer NF). The algorithm for SCP worker instances will be described in detail below. Rate limiting policing may be implemented in two different algorithms. One algorithm uses a fixed window and another algorithm uses a sliding window. FIG. 5 illustrates the fixed window rate policing algorithm that may be implemented by rate limiting policer 400. The fixed window algorithm works with two different configurations. One configuration is max limit configuration where, if the number of requested tokens would cause the maximum limit capacity of the producer NF to be exceeded, the request is denied. Another configuration option is the best effort configuration option in which if the number of tokens requested in a given window exceed the number of available tokens, the available tokens can be allocated even though they do not completely satisfy the current request. For every token demand, rate limiting policer 400 returns the granted tokens as per the algorithm and the time remaining in the current window.

Referring to the flow chart in FIG. 5, an SCP worker may initially or intermittently request tokens for the producer NF service instance that the SCP worker instance has selected to provide service for a given service request. The request for allocation of tokens may include the current timestamp and the current token ask (number of tokens requested). In step 500, rate limiting policer 400 receives the request for allocation of tokens and performs a lookup in database 402 to determine whether the request is a new request for the current time interval or whether tokens have already been allocated to the requester during the current time interval. In step 502, if a record is not found in the lookup, the request is a new request, and control proceeds to step 504 where we begin the first window of token allocation for Service-X. In here, the number of previously allocated tokens is set to zero because we have just created the window, and the previous expiry time is set to the current timestamp plus the window length, i.e., the expiry time of the created window. In step 502, if a record is found, then the request is a subsequent request for the same requester and control proceeds to step 506 where the previous allocated tokens and the previous expiry time are loaded.

In step 508, it is determined whether the P-Expiry timer has expired. The P-Expiry timer controls the expiration of previously allocated tokens. If the P-Expiry timer has expired, control proceeds to step 504 where the current request is processed like a new request. If the previous expiry time has not expired in step 508, control proceeds to step 510. In step 510 it is determined whether the previous number of allocated tokens plus the current number of requested tokens exceeds the maximum limit for the service instance for the time interval. If the maximum limit is not exceeded, control proceeds to step 510 where the requested tokens are allocated and the variable P-Tokens (previous tokens) is set to be equal to current value of P-Tokens plus C-Tokens (currently requested tokens). In step 512, the values of P-Tokens and C-Tokens are stored in database 402. The SCP worker instance can then consume the tokens by sending service requests to the producer NF service instance. In one implementation, one token allows the SCP worker instance to send one service request to a producer NF service instance. After the SCP worker instances sends a service request to a producer NF service interest, the SCP worker instance decrements the number of available tokens.

Returning to step 510, if the previously allocated tokens plus the currently requested tokens for the time interval exceeds the maximum limit, control proceeds to step 512 where it is determined whether best effort allocation is implemented. As described above, best effort allocation allows tokens to be allocated even when the number of available tokens is not sufficient to satisfy the current request. If best effort allocation is not implemented, control proceeds to step 516 where the token demand is denied and then to 512 where the values of P-Tokens and P-Expiry are stored in database 402. If best effort allocation is implemented, control proceeds to step 514 where the leftover tokens are allocated. The number of tokens allocated is equal to the maximum limit minus the previously allocated tokens. Control then proceeds to step 512 where the values of P-Tokens and P-Expiry are stored in database 402.

FIG. 5 illustrates the fixed window token allocation algorithm implemented by egress rate limiting policer 400. As stated above, in another example, the token allocation algorithm may utilize a sliding window. In a sliding window approach, the initial and expiry time for a given token allocation window move in time. Tokens within a window are divided into buckets, and each bucket has a start time and a length. When the current timestamp passes the end of a bucket (bucket start time plus length), unused tokens within the bucket expire and can be reclaimed and used to satisfy requests for tokens from the same or other SCP worker instances. Using a sliding window thus increases the availability of unused tokens.

Figure 6:
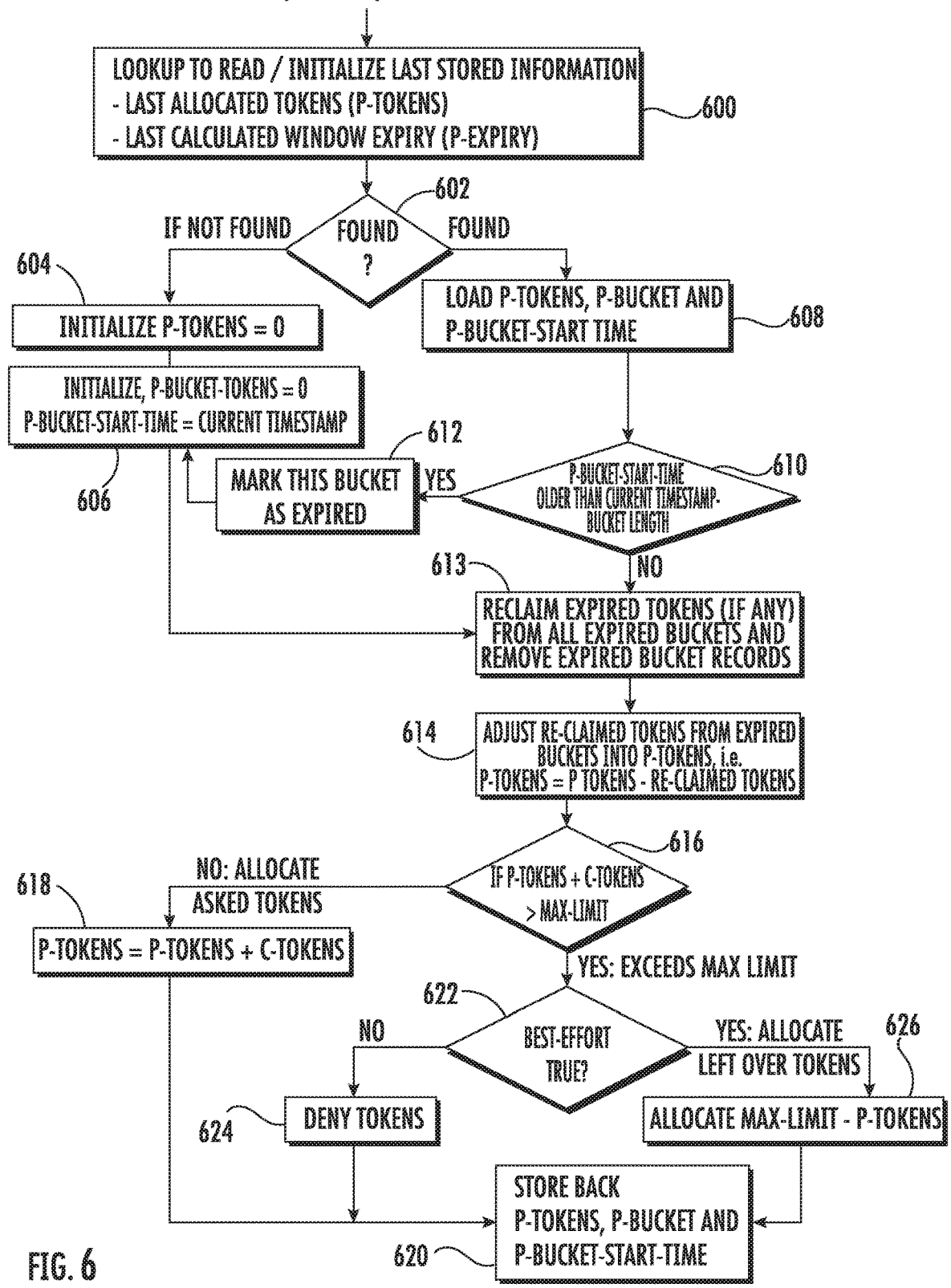
FIG. 6 is a flow chart illustrating a sliding window token bucket algorithm that may be implemented by a rate limiting policer to perform egress rate limiting of traffic to producer NF service instances.

FIG. 6 is a flow chart illustrating an exemplary sliding window token bucket algorithm that may be implemented by rate limiting policer 400. Referring to FIG. 6, an SCP worker initiates or intermittently asks for tokens to process a request targeted for a service. The request specifies the current timestamp and the current number of tokens requested. In step 600, rate limiting policer 400 performs a lookup in database 402 to determine whether the request is a new request for the time interval or an existing request. If an entry is not located in the lookup, the request is a new request. Accordingly, control proceeds from step 602 to step 604 where the previously allocated tokens variable (P-Tokens) for the time interval is initialized to zero. Control then proceeds to step 606 where the variable P-Bucket-Tokens is set to zero and the variable P-Bucket-Start-Timestamp is set to the current timestamp.

In step 602, if an entry is found, then the request is a subsequent request for the current time interval. If the request is a subsequent request, control proceeds to step 608 where the previously allocated tokens (P-Tokens), the variable P-Bucket-Tokens, and the variable P-Bucket-Start-Time are initialized to the values located in the database. Control then proceeds to step 610 where it is determined whether the variable P-Bucket-Start-Time is older than the current timestamp minus the bucket length. If this is true, control proceeds to step 612 where the current bucket is marked as expired and then to step 606 where the variable P-tokens-bucket is set to zero and the variable P-Bucket-Start-Time is set to the current start time.

After step 610, control proceeds to step 613 where any expired tokens are reclaimed from expired buckets, and expired bucket records are removed. From step 613, control proceeds to step 614 where reclaimed tokens from expired buckets are adjusted into P-Tokens (i.e., P-Tokens=P-Tokens−reclaimed tokens). Control then proceeds to step 616 where it is determined whether the previously allocated tokens plus the current requested tokens is greater than the maximum limit. If the sum of the previously allocated tokens and the current tokens is not greater than the maximum limit, the tokens are allocated and control proceeds to step 618 where P-Tokens is set to the previously allocated tokens plus the currently requested tokens. Control then proceeds to step 620 where the values of the variables P-Tokens, P-Bucket-Tokens, and P-Bucket-Timestamp are stored in database 402.

Referring to step 616, if the sum of the previously allocated tokens and the currently requested tokens exceeds the maximum limit for the time interval, control proceeds to step 622 where it is determined whether best effort allocation is implemented. If best effort allocation is not implemented, control proceeds to step 624 where the request is denied. If best effort allocation is implemented, control proceeds to step 626 where the remaining tokens are allocated to partially satisfy the request. Control then proceeds to step 620 where the values of the P-Tokens, P-Bucket-Tokens, P-Bucket-Timestamp variables are stored in database 402.

Figure 7A:
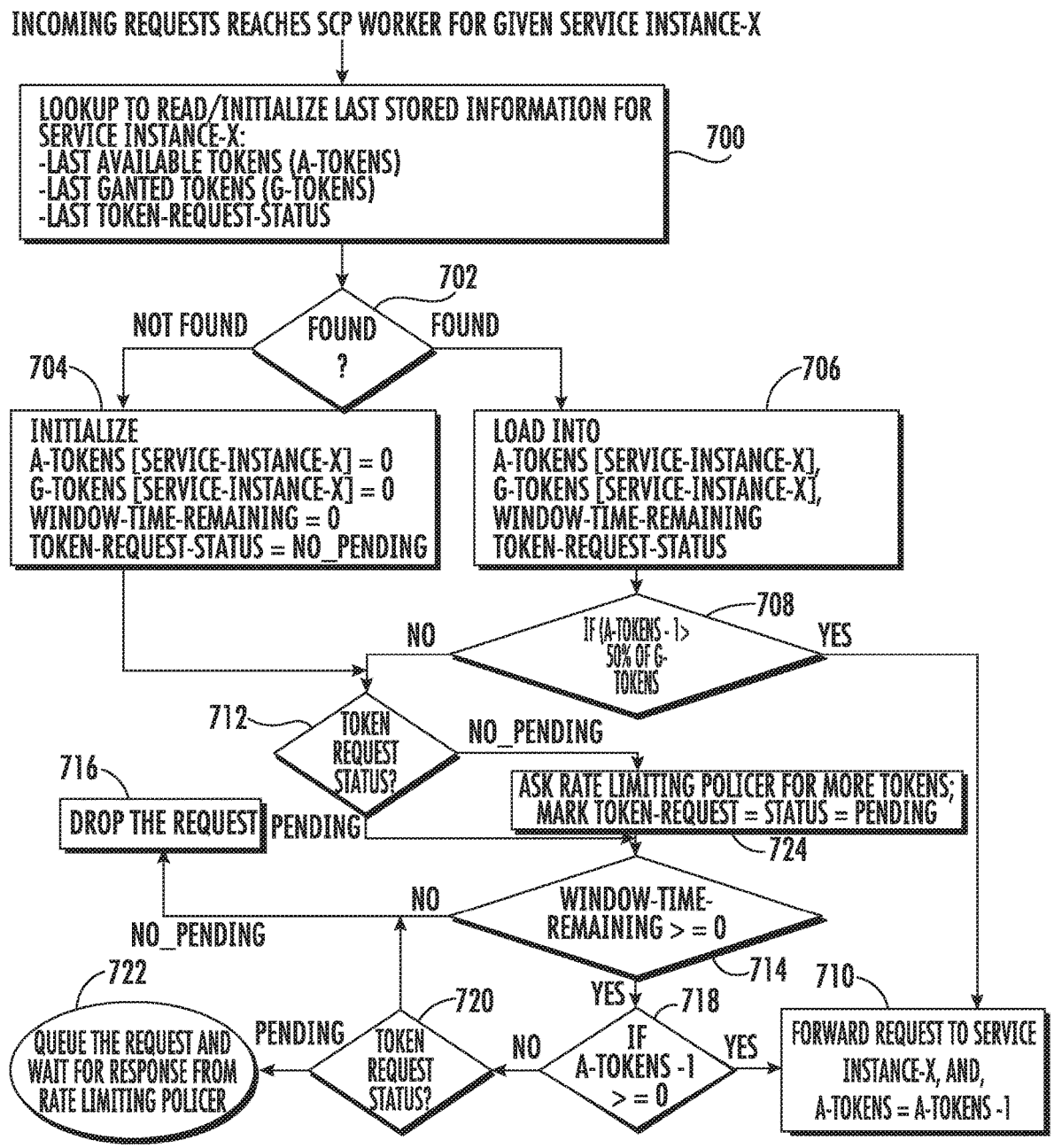
FIG. 7A is a flow chart illustrating a token demanding algorithm that may be implemented by an SCP worker instance.
Figure 7B:
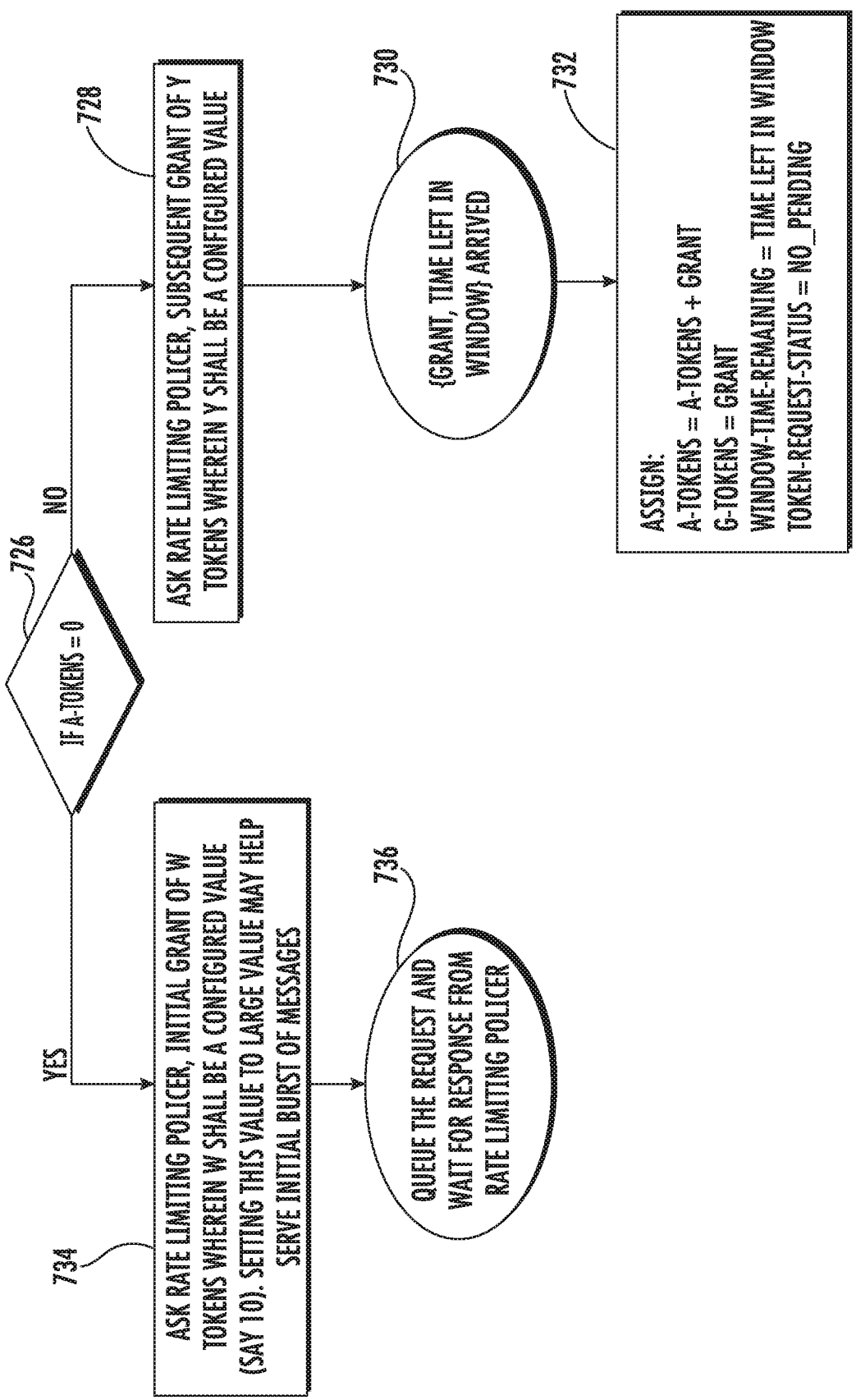
FIG. 7B is a flow chart illustrating a portion of the token demanding algorithm implemented by SCP worker instance.

As stated above, by implementing rate limiting policing at rate limiting policer 400 separate from the SCP worker instances, the logic of the SCP worker instances is simplified. FIGS. 7A and 7B illustrate the SCP worker instances token demanding algorithm that may by implemented by each SCP worker instance. In general, each SCP worker instance receives requests for a service provided by a producer NF service instance, initializes the number of tokens and asks rate limit policer 400 for an initial grant of tokens. For subsequent requests, the SCP worker instance checks whether the number of available tokens is greater than a configurable percentage of the granted tokens and forwards the request. For example, in an aggressive token demanding algorithm, the threshold amount may be set to 50% or higher to anticipate last minute token scarcity. In a less aggressive algorithm the threshold may be set to a lower percentage, such as 25%, to allow the SCP worker instances to nearly deplete their token allocations before demanding more tokens. Subsequent token demands can be fixed in size or in increasing order, e.g., based on a Fibonacci series. SCP worker instances do not need to manage the rate limiting time window traversal. The rate limiting policer will provide remaining time in the current window.

Referring to the flow chart illustrated in FIG. 7A, an SCP worker instance receives a request from a consumer NF for service provided by a producer NF service instance. In step 700, the SCP worker instance performs a lookup in its local database for service instance x to determine the current number of tokens available, the current number of tokens granted, and the last token request status for the given service instance. It is noted that the SCP worker instance is not required to know the rate capacity of the producer NF or the amount of available capacity that is being used by other consumer NFs. The database maintained by each SCP worker instance may contain the number of tokens granted by the rate limiting policer to the SCP worker instance for each producer NF service instance and the number of those tokens that have not been used.

In step 702, if a record is not found, this means that the SCP worker instance has not requested any tokens for the given producer NF service instance during the current time interval. Control then proceeds to step 704 where the SCP worker instance initializes the available tokens for service instance x to 0, the granted tokens for service instance x to 0, the window time remaining to 0, and the token request status to none pending.

If a record is found, this means that the SCP worker instance has already requested tokens during the current time interval for the producer NF service instance. If a record is found, control proceeds to step 706 where the SCP worker instance loads the information located in the lookup. The information loaded includes the available tokens for the service instance, the granted tokens for the producer NF service instance, the window time remaining, and the token request status. In step 708, the SCP worker determines whether the available tokens minus one is greater than of the above-referenced configurable percentage of the granted tokens. In other words, the SCP worker is going to ask for new tokens if more than half of its existing tokens have been used for the current time interval. This is an aggressive algorithm but may prevent the SCP worker from starving.

If the available tokens minus one is greater than the configurable percentage of the granted tokens, no new tokens are needed and control proceeds to step 710 where the request is forwarded to service instance x and the available tokens variable is decremented to indicate the use of one token to satisfy the request.

If the available tokens minus one is not greater than the configurable percentage of the granted tokens, control proceeds to step 712 where the SCP worker determines whether there is a pending token request for the current time interval. If there is a pending token request, control proceeds to step 714 where it is determined whether there is any time remaining the current window. If there is no time remaining in the current window, the SCP worker drops the token request in step 716. If there is time remaining in the current window, control proceeds to step 718 where the SCP worker determines whether there are any available tokens. If there are available tokens, control proceeds to step 710 where the SCP worker forwards the service request and decrements the number of available tokens. If there are no available tokens, control proceeds to step 720, where it is determined what the pending token request status is. If there is a token status request, control proceeds to step 722 where the request is queued, and the SCP worker waits for the response from the rate limiting policer. If there are no pending token requests, control proceeds to step 716 where the current request is dropped.

In step 712, if there are no pending token requests and the number of available tokens is less than half of the granted tokens, control proceeds to step 724 where the SCP worker requests tokens from the rate limiting policer and marks the pending token status request variable to pending.

FIG. 7B illustrates the token demanding algorithm. In FIG. 7B, in step 723, if the number of the available tokens is equal to zero, control proceeds to step 728 where the SCP worker asks the rate limiting policer for a grant of y tokens where y is configurable value. In step 730, the SCP worker receives a grant with time left in the current window. In step 732, the SCP worker sets the available tokens to the number of currently available tokens plus the grant. The granted tokens variable is set to the number of tokens in the grant. The window time remaining variable is set to the time left in the current window and the token request status is set to no pending requests.

In step 726, if the number of available tokens is equal to zero, control proceeds to step 734 where the SCP worker instance asks the rate limiting policer for an initial grant w tokens, where w is a configurable value. Setting w to be a large value may facilitate serving an initial burst of messages. In step 736, the SCP worker instance waits for grant from the rate limiting policer. When the grant occurs in step 730, control proceeds to step 732 where the SCP worker instance updates its variables to reflect the token grant.

Figure 8:
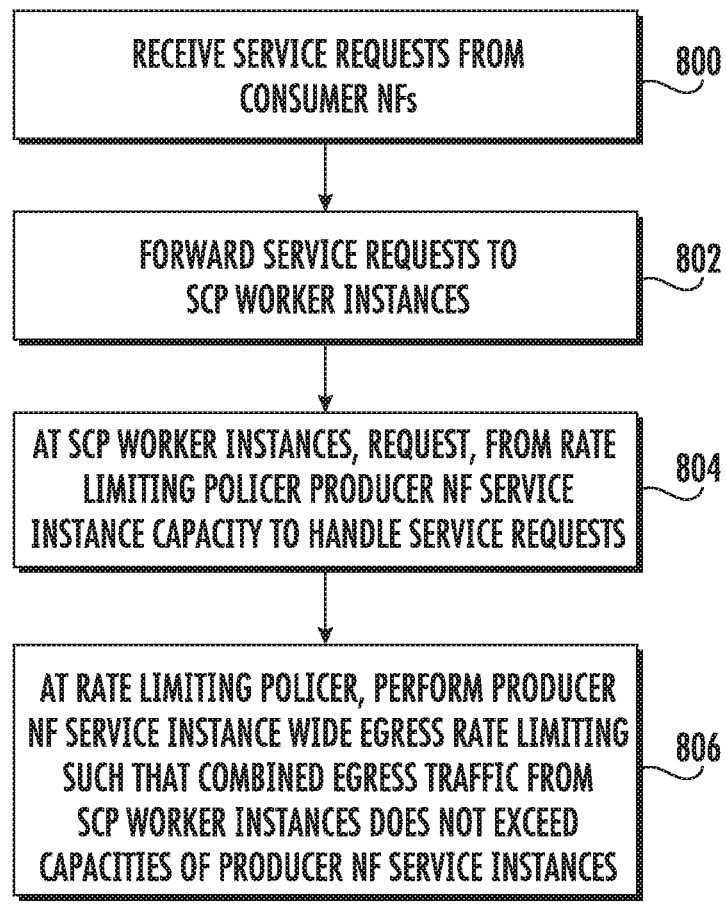
FIG. 8 is a flow chart illustrating an exemplary process for NF service instance wide egress rate limiting.

FIG. 8 is a flow chart illustrating an exemplary process for network function service instance wide egress rate limiting at a service communication proxy. Referring to FIG. 8, in step 800, service requests are received from consumer NFs. For example, service communication proxy 200 may receive service requests from consumer NFs 204 to access services provided by producer NFs. The service requests may be initiated in response to a UE connecting to the network or initiating a communications session.

In step 802, the service requests are forwarded to SCP worker instances. For example, 5G service consumer NFs 204 may send service requests to a single IP address of SCP 200. SCP 200 may forward the requests to SCP worker instances 210 and 212. In one example, SCP 200 may load balance the incoming service requests among SCP worker instances 210 and 212.

In step 804, the SCP worker instances request, from the rate limiting policer, producer NF service instance capacity to handle the service requests.

For example, SCP worker instances 210 and 212 may request tokens or other indications of producer NF service instance capacity from rate limiting policer 400 to handle the service requests. The requests from the SCP worker instances may identify the producer NF that provides the service identified in the service requests. The SCP worker instances may be aware of the services provided by the producer NF service instances based on service registrations from the producer NFs.

In step 806, the rate limiting policer performs producer NF service instance wide egress rate limiting such that combined egress traffic from the SCP worker instances does not exceed the capacities of producer NF service instances. For example, rate limiting policer 400 may grant or deny tokens in response to token requests from SCP worker instances 210 and 212 depending on whether the granting of a request would cause the capacity the producer NF service selected by the SCP worker instances to be exceeded. If best effort token allocation is implemented, rate limiting policer 400 may partially satisfy a token allocation request with the number of available tokens during at time interval even if the requested number of tokens exceeds the number of available tokens. If best effort token allocation is not implemented, if the requested number of tokens exceeds the number of available tokens, the token allocation request will be denied. As indicated above, rate limiting policer 400 may maintain an in-memory database that it uses to keep track of producer NF service instance capacities and portions of that capacity already allocated to consumer NF service instances. Rate limiting policer 400 may access the database to determine whether to grant or deny each token allocation request.

Accordingly, using the rate limiting policer with a global view of tokens allocated for each producer NF service instance, the SCP worker instance token requesting algorithm is simplified. SCP worker instances will not drop service requests when a token demand is in the pending state with rate limiting policer. Pending requests will be queued until a response arrives from the rate limiting policer. This is true for an initial request as well when the worker gets a grant from the rate limiting policer as zero, i.e., the rate exceeded in the current rate limiting window, but there is still time left in the window, request messages received until the time window expires or drops. Subsequent token demands during a time interval can be fixed in size or set to an increasing value, such as based on a Fibonacci series. Thus, using the subject matter described herein, SCP functionality is simplified, and rate limiting is implemented on a per NF service instance basis. SCP 200 can be implemented as a proxy or API gateway for 5G producer NFs to perform egress side rate limiting for all producer NFs accessible through the SCP 200. SCP 200 and/or rate limiting policer 400 can be implemented as an on-premise hardware platform deployed at a user's site or as a service made available via a cloud network.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for network function (NF) service instance wide egress rate limiting, the method comprising:
   at a service communication proxy (SCP) including at least one processor:
      receiving service requests from consumer NFs;
      forwarding the service requests to SCP worker instances;
   at the SCP worker instances, requesting, from a rate limiting policer separate from the SCP worker instances, producer NF service instance capacity for handling the service requests;
   at the rate limiting policer:
      performing producer NF service instance wide egress rate limiting between the SCP worker instances and producer NF service instances by granting or denying requests for producer NF service instance capacity from the SCP worker instances such that combined egress traffic from the SCP worker instances does not exceed rate capacities of the producer NF service instances,
   wherein requesting producer NF service instance capacity from the rate limiting policer includes requesting an allocation of tokens from the rate limiting policer and the tokens are usable by the SCP worker instances to determine whether to grant or deny the service requests.

2. The method of claim 1 wherein performing rate limiting policing includes accessing a database for determining amounts of available tokens for each of the producer NF service instances.

3. The method of claim 1 wherein requesting an allocation of tokens includes requesting the allocation of tokens in response to a percentage of granted tokens available to one of the SCP worker instances being less than a threshold amount.

4. The method of claim 1 comprising, at the rate limiting policer, maintaining, for each of the producer NF service instances, a maximum limit of tokens that can be allocated in a time interval and granting or denying the requests for allocation of tokens based on whether a number of tokens requested by the requests for allocation of tokens would cause the maximum limit of tokens to be exceeded.

5. The method of claim 4 wherein performing producer NF service instance wide egress rate limiting includes implementing a fixed window during which tokens can be granted.

6. The method of claim 4 wherein performing producer NF service instance wide egress rate limiting includes implementing a sliding window during which tokens can be granted.

7. The method of claim 1 wherein performing producer NF service instance wide rate limiting policing includes implementing best effort token allocation wherein if a number of tokens requested by one of the SCP worker instances during a time interval would cause the maximum allocated tokens during the time interval to be exceeded, granting a remainder tokens available in the time interval that would not cause the maximum limit of tokens to be exceeded.

8. The method of claim 1 wherein performing producer NF service instance wide egress rate limiting includes implementing max limit token allocation by denying a request for allocation of tokens if a requested number of tokens would cause the maximum limit of tokens to be exceeded.

9. The method of claim 1 wherein the SCP implements at least one service communication proxy (SCP) function.

10. A system for network function (NF) service instance wide egress rate limiting, the system comprising:
    a service communication proxy (SCP) including at least one processor for receiving service requests from consumer NFs, forwarding the service requests to SCP worker instances implemented by the SCP, and requesting, by the SCP worker instances, producer NF service instance capacity for handling the service requests; and
    a rate limiting policer for performing producer NF service instance wide egress rate limiting between the SCP worker instances and producer NF instances by granting or denying requests for producer NF service instance capacity from the SCP worker instances such that combined egress traffic from the SCP worker instances does not exceed rate capacities of the producer NF service instances, wherein the SCP worker instances are configured to request producer NF service instance capacity from the rate limiting policer by requesting an allocation of tokens from the rate limiting policer, wherein the tokens are usable by the SCP worker instances to determine whether to grant or deny the service requests.

11. The system of claim 10 comprising a database accessible by the rate limiting policer for determining amounts of available tokens for each of the producer NF service instances.

12. The system of claim 10 wherein the rate limiting policer is configured to maintain, for each of the NF service instances, a maximum limit of tokens that can be allocated a time interval and to grant or deny the requests for allocation of tokens based on whether a number of tokens requested by the requests for allocation of tokens would cause the maximum limit of tokens to be exceeded.

13. The system of claim 12 wherein the rate limiting policer is configured to perform NF service instance wide egress rate limiting by implementing a fixed window during which tokens can be granted.

14. The system of claim 12 wherein the rate limiting policer is configured to perform the NF service instance wide egress rate limiting by implementing a sliding window during which tokens can be granted.

15. The system of claim 10 wherein the rate limiting policer is configured to performing the producer NF service instance wide rate limiting policing by implementing best effort allocation wherein if a number of tokens requested by one of the SCP worker instances during a time interval would cause the maximum allocated tokens during a time interval to be exceeded, granting a remainder tokens available in the time interval that would not cause the maximum limit of tokens to be exceeded.

16. The system of claim 10 wherein the rate limiting policer is configured to perform producer NF service instance wide egress rate limiting by implementing max limit token allocation, which includes denying a request for allocation of tokens if a requested number of tokens would cause the maximum limit of tokens to be exceeded.

17. The system of claim 10 wherein the SCP worker instances are configured to request an allocation of tokens in response to a percentage of granted tokens available to one of the SCP worker instances being less than a threshold amount.

18. A non-transitory computer readable medium having stored thereon executable instructions that when executed by the processor of a computer control the computer to perform steps comprising:

at a service communication proxy (SCP) including at least one processor:
receiving service requests from consumer NFs;
forwarding the service requests to SCP worker instances; and
at the SCP worker instances, requesting, from a rate limiting policer separate from the SCP worker instances, producer NF service instance capacity for handling the service requests; and at the rate limiting policer, performing producer NF service instance wide egress rate limiting between the SCP worker instances and producer NF instances by granting or denying requests for producer NF service instance capacity from the SCP worker instances such that combined egress traffic from the SCP worker instances does not exceed rate capacities of the producer NF service instances, wherein requesting producer NF service instance capacity from the rate limiting policer includes requesting an allocation of tokens from the rate limiting policer and the tokens are usable by the SCP worker instances to determine whether to grant or deny the service requests.

* * * * *

UNITED STATES PATENT AND TRADEMARK OFFICE
CERTIFICATE OF CORRECTION

PATENT NO. : 10,819,636 B1
APPLICATION NO. : 16/453955
DATED : October 27, 2020
INVENTOR(S) : Goel It is certified that error appears in the above-identified patent and that said Letters Patent is hereby corrected as shown below:

On the Title Page

On page 3, Column 1, item (56) under Other Publications, Line 4, delete "Fuctions" and insert -- Functions --, therefor.

On page 3, Column 1, item (56) under Other Publications, Line 9, delete "Redable" and insert -- Readable --, therefor.

On page 3, Column 1, item (56) under Other Publications, Line 31, delete "Microservies" and insert -- Microservices --, therefor.

On page 3, Column 1, item (56) under Other Publications, Line 33, delete "-microservies-" and insert -- -microservices- --, therefor.

On page 3, Column 1, item (56) under Other Publications, Line 63, delete "Netwok" and insert -- Network --, therefor.

On page 3, Column 1, item (56) under Other Publications, Line 68, delete "Servies" and insert -- Services --, therefor.

On page 3, Column 2, item (56) under Other Publications, Line 3, delete "Functio" and insert -- Function --, therefor.

On page 3, Column 2, item (56) under Other Publications, Line 15, delete "Commision," and insert -- Commission, --, therefor.

On page 3, Column 2, item (56) under Other Publications, Line 33, after "Specification" insert -- Group --.

On page 3, Column 2, item (56) under Other Publications, Line 39, delete "Service and Systems" and Signed and Sealed this
Fifteenth Day of June, 2021

Drew Hirshfeld
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 10,819,636 B1 insert -- Services and System --, therefor.

On page 3, Column 2, item (56) under Other Publications, Line 53, delete "Mapping" and insert -- Mappings --, therefor.

On page 3, Column 2, item (56) under Other Publications, Line 69, delete "36.1413," and insert -- 36.413 --, therefor.

On page 3, Column 2, item (56) under Other Publications, Line 71, delete "Netowrk" and insert -- Network --, therefor.

On page 4, Column 1, item (56) under Other Publications, Line 12, delete "(SGSG)" and insert -- (SGSN) --, therefor.

On page 4, Column 1, item (56) under Other Publications, Line 16, delete "Northboud" and insert -- Northbound --, therefor.

On page 4, Column 1, item (56) under Other Publications, Line 36, delete "Techinical" and insert -- Technical --, therefor.

On page 4, Column 2, item (56) under Other Publications, Line 7, delete "enehanements" and insert -- enhancements --, therefor.

On page 4, Column 2, item (56) under Other Publications, Line 12, delete ""Observie" and insert -- "Observing --, therefor.

In the Specification

In Column 10, Line 64, delete "may by" and insert -- may be --, therefor.